No. 659,694. Patented Oct. 16, 1900.
W. B. POTTER.
HIGH POTENTIAL TROLLEY SYSTEM.
(Application filed Jan. 11, 1898.)

(No Model.) 2 Sheets—Sheet 1.

WITNESSES:
A. F. Abell.
E. Williams, Jr.

INVENTOR:
William B. Potter, by
Albert G. Davis.
Atty.

No. 659,694. Patented Oct. 16, 1900.
W. B. POTTER.
HIGH POTENTIAL TROLLEY SYSTEM.
(Application filed Jan. 11, 1898.)
(No Model.) 2 Sheets—Sheet 2.
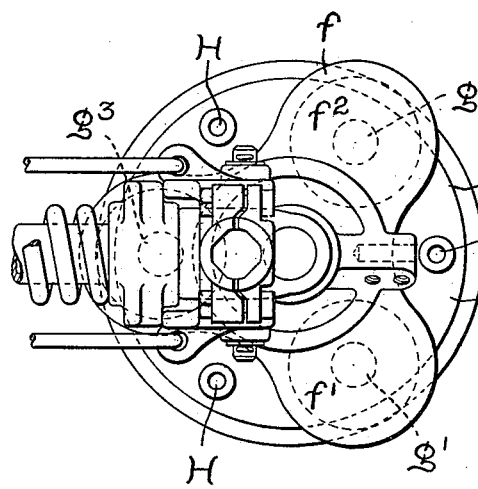
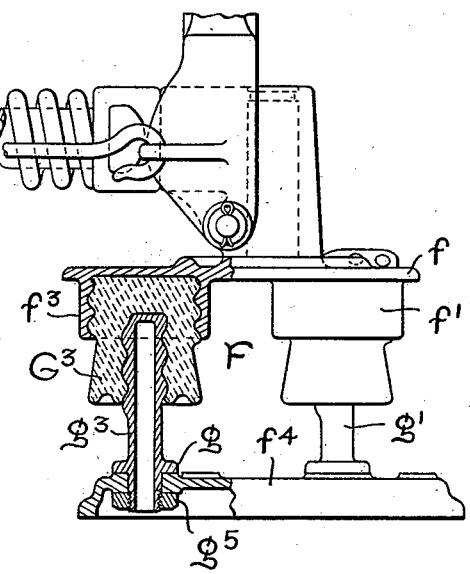
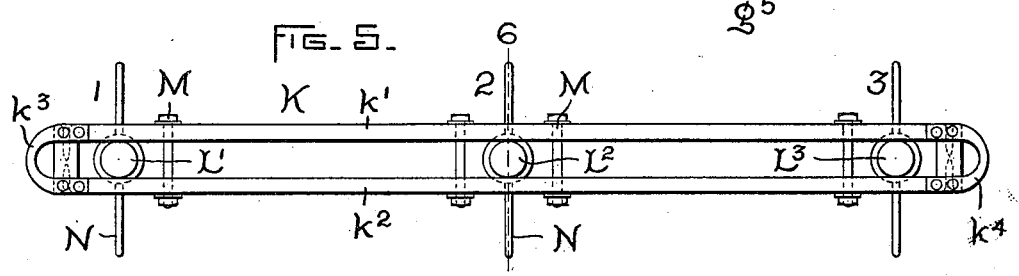
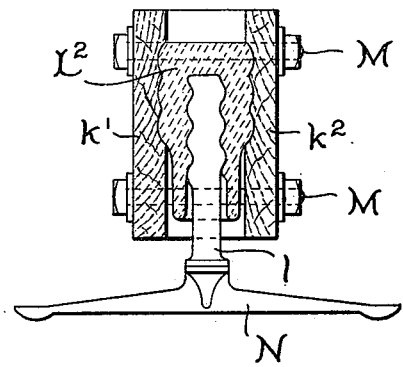
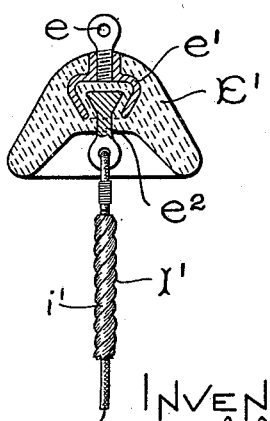
WITNESSES:
A. H. Abell.
E. Williams, Jr.
INVENTOR
William B. Potter, by
Albert G. Davis.
atty.

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

HIGH-POTENTIAL TROLLEY SYSTEM.

SPECIFICATION forming part of Letters Patent No. 659,694, dated October 16, 1900.

Application filed January 11, 1898. Serial No. 666,328. (No model.)

*To all whom it may concern:*

Be it known that I, WILLIAM B. POTTER, a citizen of the United States, residing at Schenectady, in the county of Schenectady, State of New York, have invented certain new and useful Improvements in High-Potential Trolley Systems, (Case No. 633,) of which the following is a specification.

My present invention relates to trolley systems for high-potential railway-lines. It is well adapted to polyphase systems, though it may be usefully applied with others.

It has for its object to so arrange the parts of the trolley that any considerable leakage or short-circuit across the lines is rendered impossible.

It also has for its object to arrange the controlling-cord of the trolley so that the conductor is not likely to receive a dangerous shock in wet weather if it should become necessary to replace the trolley for any reason.

To effect the first purpose of my invention, I insulate the trolley-base from the car by porcelain insulators carried on suitable supports of one kind or another, so that the trolley-base is entirely insulated. It is of course intended that the usual insulated conductors shall be used to supply the motors in such a construction.

To effect the second purpose of my invention pointed out above, I insulate the cord from the trolley-pole by a suitable device made of substantial insulating material, such as porcelain or the compressed asbestos forms of insulation now well known in the art. Although this will in itself form ordinarily a sufficient protection, I further protect the operator by forming this cord with a metallic core, which is grounded upon the truck-frame of the locomotive and is surrounded with any suitable flexible insulation, a hempen cord being ordinarily sufficient.

The trolley is designed to be used with potentials in excess of those commonly employed—five or six thousand volts, for instance.

Figure 1:
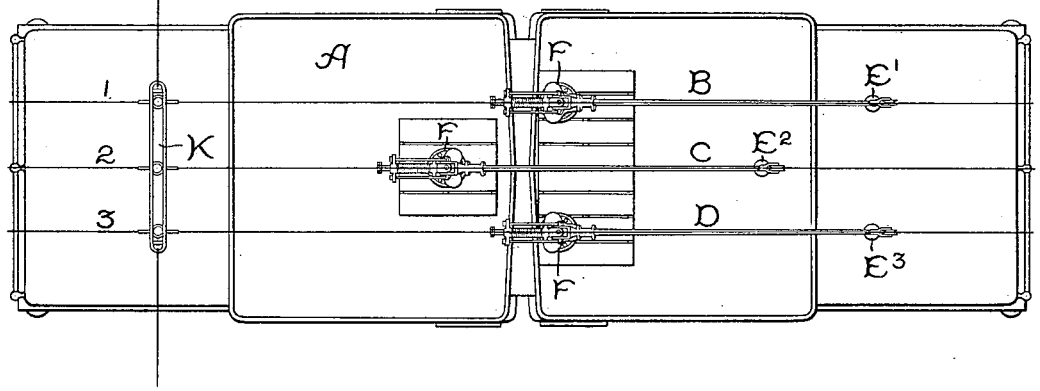
Figure 2:
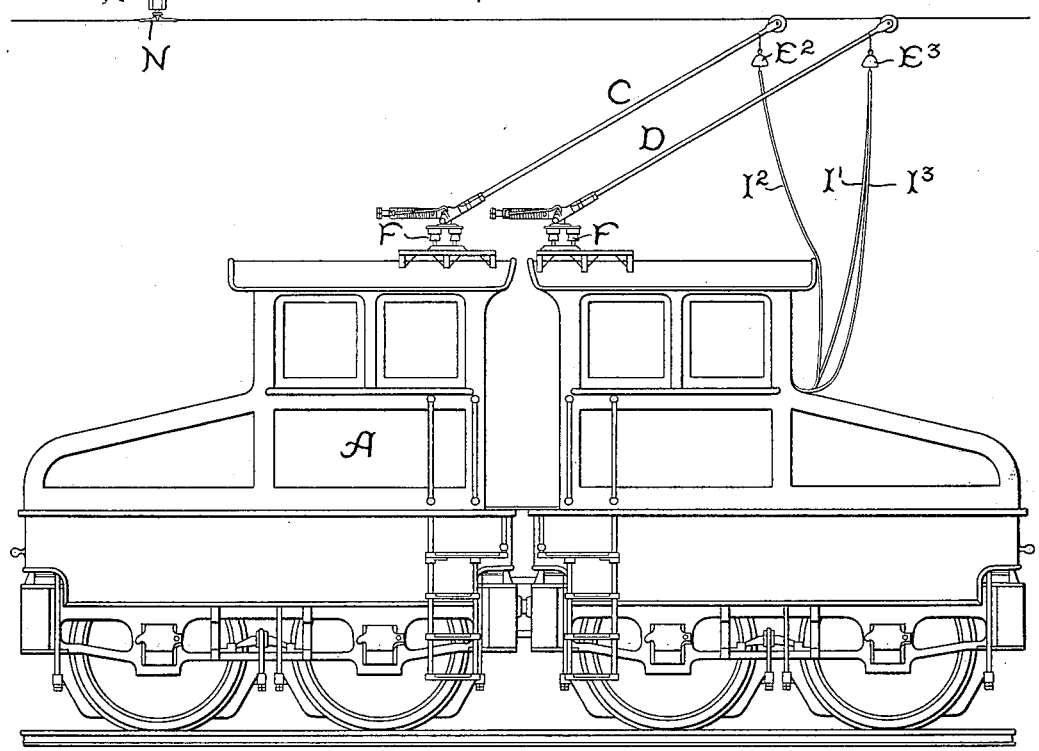

The accompanying drawings show my invention, Figures 1 and 2 being a plan and side elevation of an electric locomotive of a now well-known type equipped with three trolleys running upon the three line conductors of a polyphase system. Fig. 3 is a plan, and Fig. 4 a side elevation, partly in section, of the trolley-base. Figs. 5 and 6 show a line-insulator suitable for use in this connection. Fig. 7 is a section of the trolley-cord insulator.

In Figs. 1 and 2, A is the body of the locomotive, upon which are mounted the three trolleys B C D.

F F F are the trolley-bases, and I' $I^2$ $I^3$ are the cords of the respective trolleys.

E' $E^2$ $E^3$ are the insulators.

The bases are best understood from Figs. 3 and 4. In these the base F is composed of a base-plate $f^4$, upon which are mounted studs $g'$ $g^2$ $g^3$, two of which are shown in Fig. 4. Each of the studs, as $g^3$, is provided with an expanded foot $g$, resting upon the base-plate $f^4$ and secured in place by a nut $g^5$. A body of insulating material $G^3$ surrounds the stud, the latter being shown as hollow for lightness. Upon the three insulating-bodies, which are made of porcelain or other material capable of standing the stress of high potentials, is a cap-plate $f$, provided with screw-threaded sockets $f'$ $f^2$ $f^3$, in which the bodies of insulating material respectively fit. To this the trolley-pole (the special form of which is not of my invention) is secured in the usual manner. The whole construction is fastened to the car-roof by bolts or screws passing through the holes H. (Shown in Fig. 3.)

One of the trolley-cord insulators E' is shown in Fig. 7. There a shackle composed of the inclosing part $e'$ and a stud $e^2$, having an expanded top within the part $e'$, are insulated from each other and surrounded by a body of insulating material formed with the usual petticoat. An eyebolt $e$ is secured to the shackle, and the cord I' is secured to the stud $e^2$. The core $i$ of this cord is of wire, stranded cable, or other conductor, and, as shown diagrammatically, is connected to ground in any suitable way, as by attaching it to the truck-frame. A sheathing $i'$ of hemp or other insulating material is applied around the metallic core.

In Figs. 5 and 6 the insulator for the trolley-wires of the high-potential system is shown. The wires are attached at 1 2 3 to the trolley-ears N. The whole insulator is lettered K, and it is composed of two boards $k'$ $k^2$, secured together at their ends by iron clamps $k^3$ $k^4$, to which the span-wire may be attached. Bolts M act to draw the boards together to inclose the porcelain insulators L, provided with studs $l$, to which the trolley-ears N are secured, this construction being best understood from Fig. 6.

What I claim as new, and desire to secure by Letters Patent of the United States, is—

1. A trolley-base consisting of a plate for attaching the base to the car, a second plate carrying the trolley, and a body or bodies of insulating material separating the plates.

2. The combination, with a trolley-pole, of a conducting-cord, grounded at one end, and attached to and insulated from the pole at the other.

3. The combination, with a trolley-pole, of a conductor insulated from, but attached to the trolley-pole at one end, and grounded at the other.

4. The combination with a trolley-pole, of a grounded conducting-cord.

5. The combination with a trolley-pole, of a grounded conducting-cord connected to but insulated from the pole.

6. A trolley-base consisting of a base-plate, a cap-plate and insulators carried by the base-plate and supporting the cap-plate.

7. A trolley-base consisting of a base-plate, a cap-plate and petticoated insulators carried by the base-plate and supporting the cap-plate.

8. As an article of manufacture, a trolley-base consisting of a base-plate, a cap-plate and insulating material interposed between said plates and through the medium of which the said plates are secured together.

9. The combination of a trolley-pole, a conducting-cord carried by the trolley-pole, and a water-shedding device interposed between the cord and the pole.

10. The combination of a trolley-pole with an insulated conducting-cord.

In witness whereof I have hereunto set my hand this 10th day of January, 1898.

WILLIAM B. POTTER.

Witnesses:
B. B. HULL,
J. LED. LANGDON.